United States Patent [19]

Olapinski et al.

[11] Patent Number: 4,895,815
[45] Date of Patent: Jan. 23, 1990

[54] SINTERED FORM BODY

[75] Inventors: Hans Olapinski, Aichwald; Wolfgang Burger, Wernau; Ulf Dworak, Baltmannsweiler, all of Fed. Rep. of Germany

[73] Assignee: Feldmuehle Aktiengesellschaft, Duesseldorf, Fed. Rep. of Germany

[21] Appl. No.: 128,043

[22] Filed: Dec. 3, 1987

[30] Foreign Application Priority Data

Feb. 26, 1987 [DE] Fed. Rep. of Germany ....... 3706209

[51] Int. Cl.$^4$ ...................... C04B 35/46; C04B 35/10
[52] U.S. Cl. .................... 501/134; 501/153; 501/127; 501/128
[58] Field of Search ................ 501/134, 153, 127, 128

[56] References Cited

U.S. PATENT DOCUMENTS

| 4,277,539 | 7/1981 | Keller et al. | 502/439 |
| 4,483,944 | 11/1984 | Day et al. | 502/439 |
| 4,526,824 | 7/1985 | Dworak et al. | 502/439 |

FOREIGN PATENT DOCUMENTS

| 1471518 | 10/1969 | Fed. Rep. of Germany | 501/128 |
| 3534149 | 1/1987 | Fed. Rep. of Germany | 501/134 |
| 3706209 | 10/1987 | Fed. Rep. of Germany | |
| 246977 | 6/1987 | German Democratic Rep. | |
| 57-3767 | 1/1982 | Japan | 501/134 |

Primary Examiner—William R. Dixon, Jr.
Assistant Examiner—Susan E. Hollenbeck
Attorney, Agent, or Firm—Felfe & Lynch

[57] ABSTRACT

Disclosed is a starting mixture for the preparation of a sintered body on a basis of aluminum titanate consists of more than 46 wt.-% $TiO_2$, up to 49.5 wt.-% $Al_2O_3$, 3 to 5 wt.-% quartz, and less than 0.2 wt.-% impurities, $Al_2O_3$ and $TiO_2$ being present in the weight ratio of 1:0.95 to 1:1.05. The sintered body according to the invention is composed of:

15 to 35 wt.-% $TiO_2$;
60 to 85 wt.-% $Al_2TiO_5$ (aluminum titanate);
up to 5 wt.-% $Al_2O_3$;
up to 17 wt.-% Mullite; and
max. 0.2 wt.-% impurities, all parts by weight together totaling 100 wt.-%.

Also disclosed are processes for making the sintered body.

10 Claims, 2 Drawing Sheets

SINTERED FORM BODY

BACKGROUND OF THE INVENTION

The present invention is in a sintered body based on aluminum titanate which is produced from a mixture which contains oxides of aluminum and titanium. The invention furthermore relates to a process for the production of the sintered body and its use.

DE-AS 27 50 290 (U.S. Pat. No. 4,277,539) discloses a silicatic aluminum titanate. The preparation of this known aluminum titanate sets out from 50 to 60 wt.-% of aluminum oxide, 40 to 45 wt.-% of titanium dioxide, 2 to 5 wt.-% of kaolin, and 0.1 to 1 wt.-% of magnesium silicate. The $SiO_2$ addition is intended to achieve an improved thermal stability of the pure aluminum titanate. However, the reference also states that the addition includes thermal expansion and retards formation of aluminum titanate, so that a higher firing temperature is necessary in order to obtain the same content of aluminum titanate. Also, the MgO component is considered necessary for the improvement of the physical properties. Sepiolite, for example, is proposed for this purpose. This is said to achieve a relatively flat expansion curve, so that the coefficient of thermal expansion is under $1.5 \times 10^{-6} K^{-1}$ up to 1000° C. As it appears from the examples of that disclosure, the mixing of aluminum oxide and titanium dioxide is performed in the stoichiometric range ($Al_2O_3:TiO_2=1:0.78$) or with a very slight excess of titanium dioxide. The ratio of $Al_2O_3:TiO_2$ in Example 5 of that disclosure is 1:0.81. The most favourable results are represented by this example.

The teaching of DE-AS 27 50 290 is thus to be interpreted as recommending the highest possible content of aluminum titanate in the finished body.

DE-AS 12 38 376, discloses production of a ceramic substance from $Al_2O_3$, $SiO_2$ and $TiO_2$. On account of its plasticity, kaolinite is used as the starting component, and also lithium carbonate aluminum hydroxide and other metal oxides. The resulting low strengths of the substance described in DE-AS 12 38 376 are attributed, according to DE-AS 27 50 290, to the lack of a magnesium oxide compound in the starting mixture. These known substances have a coefficient of thermal expansion in the range up to 1000° C. of $-0.1$ to $-0.8 \times 10^{-6} K^{-1}$.

EP-A 133 021 refers to an aluminum titanate-mullite ceramic composed of 60 to 75 wt.-% of $Al_2O_3$, 15 to 35 wt.-% $TiO_2$ and 1 to 16.5 wt.-% of $SiO_2$. Additionally proposed are 0.5 to 5 wt.-% of $Fe_2O_3$ and/or 0.5 to 5 wt.-% of rare earth metal oxides. The described compositions of the sintered ceramic include mullite contents of 20 to 40 wt.-%, $Al_2TiO_5$ contents of 50 to 70 wt.-% and $Al_2O_3$ contents of 10 to 12 wt.-%. Also mentioned are oxides of iron, lanthanum and neodymium in contents of more than 3 wt.-% total. The coefficient of thermal expansion is said to be less than $2.5 \times 10^{-6} K^{-1}$ in the range from room temperature to 1000° C.

EP-A 37 868 relates to a ceramic material of low thermal expansion which is made on the basis of aluminum titanate with the addition of magnesium oxide and iron oxide. The main component of the crystalline material phase is given as a solid solution of magnesium oxide/aluminum oxide/titanium oxide/silicon oxide/iron oxide. A number of compounds can be used as starting substances, e.g., kaolin to obtain aluminum oxide, or magnesium carbonate to obtain magnesium oxide. The achievable minimum flexural strength values of about 5 MPa at room temperature, are estimated to be very low. The coefficient of thermal expansion is not to exceed a value of $2 \times 10^{-6} K^{-1}$ in the range from 25 to 800° C.

In accordance with U.S. Pat. No. 2,872,726, the addition of chromium oxide, preferably in amounts of 25 to 60 wt.-%, is proposed for a silicate-free material that is made with the use of $Al_2O_3$ and $TiO_2$. The achieved flexural strengths are relatively high and are far superior to the strengths which are commonly known for aluminum titanate materials. The ratio of aluminum oxide to titanium oxide is not mentioned either for the starting mixture or for the composition of the finished material. Only the ratio of oxygen to the individual elemental metal components such as aluminum, titanium and chromium is given.

U.S. Pat. No. 3,534,286 describes a material in which $Al_2O_3$ is one of the chief components. A typical composition consists of 75.2 wt.-% $Al_2O_3$, 22.8 wt.-% $Al_2TiO_5$ and 2 wt.-% $SiO_2$. The presence of free $TiO_2$ in the solid material is not mentioned. The material is used for scattering microwaves and is to have a low porosity exemplified as a value of up to 7%.

In U.S. Pat. No. 3,607,343 $TiO_2$ is used in an amount of 1 to 50 vol.-% to coat $Al_2O_3$ particles. The coated particles are used with the addition of a suitable binding agent, e.g., on the basis of a phenolic resin, for coating by the flame-spraying process.

For the preparation of a sinterable aluminum titanate powder it is proposed according to U.S. Pat. No. 3,825,653 to coprecipitate halogenic or alkoxy compounds of aluminum and titanium and to use the coprecipitate, after drying and calcining, for the sintering of aluminum titanate products. The products manufactured in this manner are said to have a thermal expansion coefficient of less than $1 \times 10^{-6} K^{-1}$ in the temperature range of 25° to 1000° C. The density is said to be, depending on the manufacturing process, 70 to 85% of the theoretical density of 3.73 g/cm$^3$, i.e., around 2.6 to 3.2 g/cm$^3$. Mixtures with a ratio of $Al_2O_3$ to $TiO_2$ are given as 1:1, and 1:3 to 3:1. A mixture of silicate compounds is not mentioned. The powder described in the above U.S. patent is used according to U.S. Pat. No. 3,890,140 for the production of melting crucibles for uranium and uranium alloys. The production of the melting crucible by the hot pressing method sets out from an aluminum titanate powder of a size of 10 to 70 microns. A ratio of 50 mol-% each of $Al_2O_3$ and $TiO_2$ is considered suitable.

In U.S. Pat. No. 4,118,240 a composition is described which consists essentially of aluminum titanate with the addition of 1.5 to 10 wt.-% of tin dioxide ($SnO_2$) and 2 to 3 wt.-% of $SiO_2$. Instead of $SnO_2$, rare earth oxides of, for example, lanthanum, cerium and yttrium are used. A synergetic action between $SiO_2$ and the rare earth oxides and tin dioxide is expected. The amount of $TiO_2$ used is about 37 and 38 wt.-% as compared with 53 to 55 wt.-% of $Al_2O_3$. In the case of a composition described in this patent, of $Al_2O_3$, $TiO_2$ and $SiO_2$, a coefficient of thermal expansion of $1.2 \times 10^{-6} K^{-1}$ is achieved in the temperature range of 20° to 1000° C., and a flexural strength at room temperature of (converted) 18 MPa.

In the Federal German publication, H. J. Pohlmann, K. Schricker, D. H. Schuller, Ber. Dt. Keram. Ges., 52 (1975), pages 179 to 183, the properties of the Al- $_2O_3$—$TiO_2$—$SiO_2$ system are described, kaolin finding application as a source of $SiO_2$. As it appears from the structural studies described, these samples contain substantially naught but aluminum titanate as a crystalline phase.

A porous ceramic molding containing more than 80 wt.-% of aluminum titanate, 4 to 10 wt.-% $SiO_2$, 0.5 to 5 wt.-% $La_2O_3$, $CeO_2$ and/or $Y_2O_3$ and $Al_2O_3$ and $TiO_2$ is described in U.S. Pat. No. 4,327,188.

DE-AS 25 09 765 describes a wear-resistant, low-friction and corrosion-resistant sintered material based on $TiO_2$ which contains 1 to 5 wt.-% $Al_2O_3$ and 1 to 5 wt.-% $SiO_2$, balance $TiO_2$. The material can also contain a maximum of 0.1 wt.-% of alkali and alkaline earth oxide.

According to GDR Patent No. 29 794, good thermal shock resistance is produced by a very low, preferably negatively linear thermal expansion coefficient. The compositions proposed according to this patent for the production of a highly refractory, oxidic material with good thermal shock resistance, are those of MgO—$A_2O_3$—$TiO_2$ and of MgO—$Al_2O_3$—$TiO_2$—$SiO_2$, wherein the $TiO_2$ content is from 15 to 75 wt.-%, the $Al_2O_3$ content 70 to 35 wt.-% and the contents of $SiO_2$ and MgO are up to 40 and 20%, respectively. The linear thermal expansion coefficient achievable with the composition of that patent is said to be less than $4 \times 10^{-6} K^{-1}$ in the range between 20° and 700° C., or it is to be preferably negative or to differ only slightly from 0. The ratios of admixture of $Al_2O_3$ to $TiO_2$ given in the Examples include the broad range of 1:0.7 to 1:1.7, the latter range applying to a silicate-free composition containing 8 wt.-% of MgO.

The last-named disclosure exemplifies the prevailing approach to improving thermal shock resistance of aluminum titanate materials by obtaining the lowest possible thermal expansion coefficient. As it is stated in that patent, the thermal shock resistance is, however, also directly dependent on, among other things, the thermal conductivity, tensile strength and modulus of elasticity. As it appears from the above-mentioned DE-AS 27 50 290, which is believed to be the closest known state of the art, preference is, however, always given to a low thermal expansion coefficient. The disclosed proposals, however, suffer the common disadvantage that the produced sintered articles do not have a thermal shock resistance that is sufficient in every case, so that defects occur either immediately during casting with metal or, under certain circumstances, after the sintered bodies have been in service for an extended period of time. The defects may be initiated by a single contact, e.g., when the article is invested in a molten metal, for example, but do not manifest themselves until later.

It has also been found that the sintered articles in question still have certain differences in quality in spite of careful attention to their physical characteristics, so that premature destruction of the sintered article occurs during its use, even though the stress does not vary. The reasons for this unexpected misbehavior of the sintered articles are not always discernible, but it is assumed that it is the result of certain structural irregularities of the sintered body.

It is thus an object of the present invention to improve the known sintered moldings based on aluminum titanate, and to improve their use in production operations, and especially their stability when invested with molten nonferrous metals in the temperature range below 800° C.

THE PREFERRED EMBODIMENT

Figure 1:
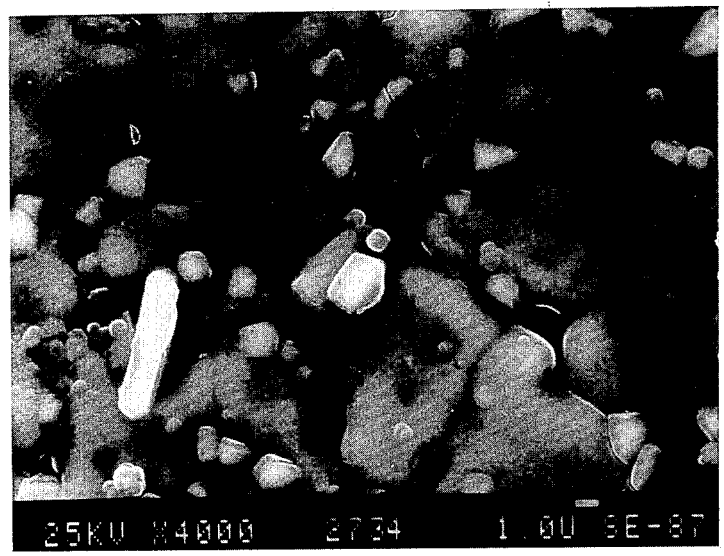
FIG. 1 shows the natural-untreated-surface of a sintered article according to Example 2 of the invention.

Contrary to the previously prevailing notions, the solution to the above-discussed drawbacks is surprisingly achieved with a starting mixture whose composition results in the presence of a relatively high free content of unreacted $TiO_2$ the finished sintered body. In contrast to the known state of the art, therefore, the added aluminum oxide or titanium oxide is not entirely reacted to aluminum titanate, but care is taken to see that a certain $TiO_2$ excess is present, which results in the presence of $TiO_2$ that has not reacted to aluminum titanate.

It has also been found that the quality and uniformity of the sintered bodies of the invention can be further improved by extremely small amounts of magnesium oxide or contents of other impurities, such as those which to some extent unavoidably form.

The present invention is in a mixture for producing a sintered body on a basis of aluminum titanate, the mixture comprising:

more than 46 wt.-% $TiO_2$;
up to 49.5 wt.-% $Al_2O_3$;
3 to 5 wt.-% quartz ($SiO_2$);
less than 0.2 wt.-% impurities, $Al_2O_3$ and $TiO_2$ being present in a weight ratio of 1:0.95 to 1:1.05, and all weight parts together make up 100 weight-percent.

Even though it is not yet understood in detail to what the superior effect of the sintered body according to the invention is to be attributed, it has nevertheless been found that the following features are especially important:

(1) the composition of the starting mixture of high-purity substances, which includes the avoidance of kaolin which is known as a component of the starting mixture in the state of the art;

(2) an aluminum oxide with a purity of at least 99% is advantageously used; and (3) the presence of a maximum of 0.2 wt.-% of impurities, such as magnesium oxide, which however is in no case necessary, and can be present in a maximum of up to 0.1 wt.-%, because the presence of this substance in the starting mixture cannot always be excluded, since it is unavoidable as an impurity, e.g., as detritus from grinding.

It is important that the titanium oxide phase is uniformly distributed in the sintered compact. It has been found that the presence of a uniformly dispersed $TiO_2$ phase, when the starting mixture according to the invention is used, results in a most extensively crack-free polished structure in the sintered compact. The presence of a largely crack-free polished structure is very important because the improved safety of the sintered compacts according to the invention in production operations is to be attributed thereto.

It is also important that the aluminum titanate grains have an average size of 5 to 20 microns; preferably even 8 to 15 microns. The average grain size of the titanium oxide is lower, and is around 0.5 to 10 microns, but in any case it is smaller than the average grain size of the aluminum titanate grains. The known sintered compacts of aluminum titanate from mixtures of the oxides of aluminum and titanium with $SiO_2$ have, in contrast, an aluminum titanate grain size of 1 to 3 microns.

The invention is also in a sintered body which is composed of:
15 to 35 wt.-% $TiO_2$;
60 to 85 wt.-% $Al_2TiO_5$ (aluminum titanate);
up to 5 wt.-% $Al_2O_3$;
up to 17 wt.-% Mullite; and
max. 0.2 wt.-% impurities;
all parts by weight together totaling 100 wt.-%.

The density of the sintered body is at least 3.0 g/cm$^3$, but in contrast to the known compacts it can increase to as much as 3.6 g/cm$^3$. The density is preferably in the range of from 3.3 to 3.5 g/cm$^3$. The flexural strength is at least 25 MPa and preferably in the area of 33 to 47 MPa. The elastic modulus is about 14000 to 25000 MPa. The coefficient of expansion is 1.5 to $3.0 \times 10^{-6}$ K$^{-1}$ in the temperature range from 400° to 800° C. and thus is substantially higher than that of the known sintering compacts according to DE-AS 27 50 290. The thermal conductivity amounts to 1–3 W/mK.

In other advantageous embodiments of the invention, importance is attached to the method of producing the compact according to the invention. The starting mixture must be composed of high-purity substances, from which the previously proposed kaolin must be expressly excluded. The necessary $SiO_2$ doping is performed in the form of quartz, while the presence of additional impurities is to be excluded insofar as possible. The maximum content of impurities must not, however, exceed 0.2% of the weight of the starting mixture and a maximum of 0.1 wt.-% of magnesium oxide is permissible. A green body or compact of a density of at least 2.4 g/cm$^3$ is made from a slip prepared, using known adjuvants, by mix-grinding the oxides to a $D_{50}$ grain size under 0.5 microns. The sintering is performed at temperatures of 1350° to 1490° C. for a period of 1 to 5 hours.

Alternatively, the compacts can also be produced by molding and pressing a powder mixture of the composition according to the invention, which contains a commonly used binding agent and is obtained by spray drying. The sintering is then performed in the above-stated temperature range for the stated period of time.

After the sintering process, the sintered body is brought to its final shape by methods known in themselves, e.g., by machining with diamond tools. An especially important field of application of the sintered articles according to the invention is their use in the production of compound bodies consisting of the sintered body recasted with metal. In this case the sintered body is hollow in the manner of a tube. Such compound bodies are, for example, exhaust pipes in internal combustion engines, especially in the area of the combustion chamber. It is especially advantageous in this case if the sintered compact is in every cross section round or oval, a concave shape is avoided, and all edges are rounded. Preferably the wall thickness is between 2 and 6 mm. Especially preferred is a wall thickness of 3 to 4 mm.

The following Examples will serve for the further explanation of the invention.

EXAMPLE 1

A starting mixture of:
49 wt.-% $Al_2O_3$,
47 wt.-% $TiO_2$, and
4 wt.-% quartz ($SiO_2$)
is dispersed in water and the slip is ground in a vibration mill for 10 h to a $D_{50}$ particle size of less than 0.5 microns. After the addition of 2% of polyvinyl alcohole as temporary binding agent, the mixture is spray dried and made into a compact by pressing at a pressure of 1000 bar. The binding agent is burned out at 300° C. and the molding is then sintered for 3 h at 1430° C. The following values are measured on the sintered compact:
Density: 3.43 g/cm$^3$
Flexural strength $\rho_B$: 38 MPa
Modulus of elasticity: 18000 MPa.
Thermal expansion coefficient in the temperature range from 400° to 800° C: $2.3 \times 10^{-6}$ K$^{-1}$
The sintered molding is composed of:
68 wt.-% $Al_2TiO_5$,
18 wt.-% $TiO_2$, homogeneously dispersed
1 wt.-% $Al_2O_3$, and
balance mullite.

EXAMPLE 2

A watery slip without binding agent is prepared with a solid content of 75 wt.-% and a particle size after grinding for six hours in a vibration mill to $D_{50}<0.5$ microns and the following composition:
48.5 wt.-% $Al_2O_3$,
48.5 wt.-% $TiO_2$,
3 wt.-% quartz ($SiO_2$).
A hollow, tube-like body is formed from the slip by casting and this green body is sintered at 1440° C. for a period of 2.5 hours.

The following values were measured on the sintered product:
Density: 3.4 g/cm$^3$
Flexural strength $\rho_B$: 36 MPa
Elastic modulus: 15000 MPa
Thermal expansion coefficient in the temperature range from 400° to 800° C: $2.1 \times 10^{-6}$ K$^{-1}$
The sintered product is composed of:
72 wt.-% $Al_2TiO_5$,
18 wt.-% $TiO_2$, homogeneously dispersed
1 wt.-% $Al_2O_3$, and
balance mullite.

Figure 2:
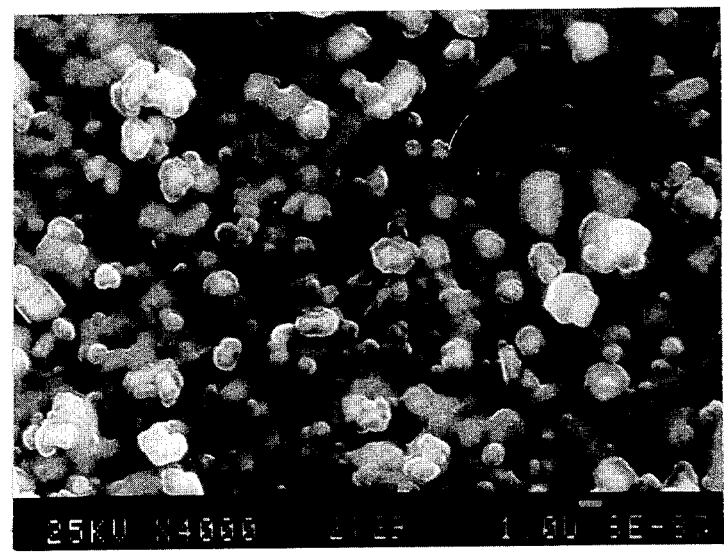
FIG. 2 shows the natural-untreated-surface of a common commercial sintered article.

A comparison of FIGS. 1 and 2 shows the substantially coarser grain of the sintered molding according to the invention.

Figure 3:
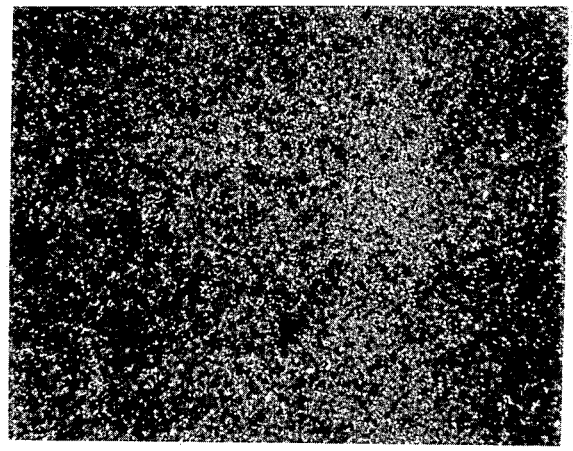
FIG. 3 shows the polished structure of the sintered article according to FIG. 1.
Figure 4:
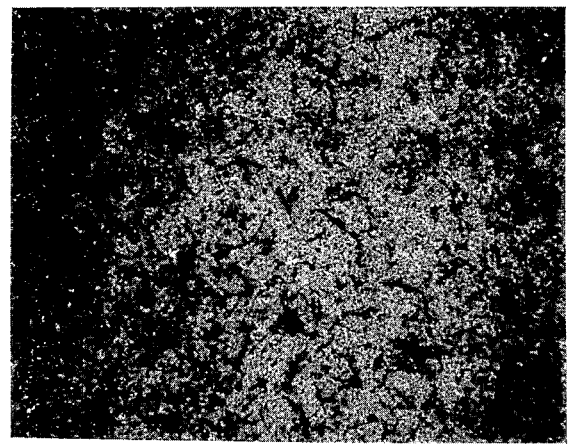
FIG. 4 shows the polished structure of the sintered article according to FIG. 2.

Comparison of FIGS. 3 and 4 shows, in the case of the sintered article according to the invention, a crack-free polished structure with a uniform distribution of $TiO_2$, whereas FIG. 4 shows a network of cracks in the polished structure.

It will be understood that the specifications and examples are illustrative but not limitative of the present invention and that other embodiments within the spirit and scope of the invention will suggest themselves to those skilled in the art.

We claim:

1. A mixture for producing a sintered body on a basis of aluminum titanate, the mixture consisting essentially of:
more than 46 wt.-% $TiO_2$;
up to 49.5 wt.-% $Al_2O_3$;
3 to 5 wt.-% quartz ($SiO_2$);

less than 0.2 wt.-% impurities, the $Al_2O_3$ and $TiO_2$ being present in a weight ratio of 1:0.95 to 1:1.05, and all weight parts together make up 100 weight-percent.

2. A sintered body consisting essentially of:
15 to 35 wt.-% $TiO_2$;
60 to 85 wt.-% $Al_2TiO_5$ (aluminum titanate);
up to 5 wt.-% $Al_2O_3$;
max. 0.2 wt.-% impurities; and
up to 17 wt.-% mullite,
all weight parts together making up 100 weight-percent.

3. The sintered body of claim 2 having a density of 3.0 to 3.6 g/cm$^3$.

4. The sintered body of claim 2 having a polished structure with a homogeneous distribution of the $TiO_2$ phase.

5. The sintered body of claim 2 having an average thermal expansion coefficient of 1.5 to $3.0 \times 10^{-6}$ K$^{-1}$ in the range from 400° to 800° C.

6. The sintered body of claim 2 wherein the aluminum titanate has an average grain size of about 5 to 20 microns.

7. A method of preparing the sintered body of claim 2 comprising: wet grinding to a $D_{50}$ particle size <0.5 microns a starting mixture of
more than 46 wt.-% $TiO_2$,
up to 49.5 wt.-% $Al_2O_3$,
3 to 5 wt.-% quartz ($SiO_2$),
less than 0.2 wt.-% impurities,
the $Al_2O_3$ and $TiO_2$ being present in a weight ratio of 1:0.95 to 1:1.05,
all weight-parts making up 100 wt.-% to form a wet ground mixture; forming a slip from the wet ground mixture; forming a green body from the slip; drying the green body to form a dried body having a green density of at least 2.4 g/cm$^3$; and sintering the dried green body at a temperature of 1350° to 1490° C. to form the sintered body.

8. The method of claim 7 wherein the sintering is for a period of 1 to 5 hours.

9. A method of preparing the sintered body according to claim 2 comprising: wet grinding to a $D_{50}$ particle size <0.5 microns a starting mixture of
more than 46 wt.-% $TiO_2$,
up to 49.5 wt.-% $Al_2O_3$,
3 to 5 wt.-% of quartz ($SiO_2$),
less than 0.2 wt.-% impurities,
the $Al_2O_3$ and $TiO_2$ being present in a weight ratio of 1:0.95 to 1:1.05,
all parts by weight making up 100 wt.-% to form a wet ground mixture; forming a slip from the wet ground mixture; adding a binding agent to the slip; spray drying the mixture to form a powder mixture; pressing the powder mixture to form a green body which has a green density of at least 2.4 g/cm$^3$; and sintering the green body at a temperature of 1350° to 1490° C. to form the sintered body.

10. The method of claim 9 wherein the sintering is for a period of 1 to 5 hours.

* * * * *

UNITED STATES PATENT AND TRADEMARK OFFICE
CERTIFICATE OF CORRECTION

PATENT NO. : 4,895,815

DATED : January 23, 1990

INVENTOR(S) : Hans Olapinski et al

It is certified that error appears in the above-identified patent and that said Letters Patent is hereby corrected as shown below:

Column 4, line 60, following "sintered compact.", the following text should appear:

"A uniform distribution of titanium oxide is achieved by intimately grinding and mixing the starting mixture. Preferred milling machines are attrition mills, vibration mills and rotation mills. The milling time ranges from 5 to 15 h."

Signed and Sealed this

Ninth Day of July, 1991

Attest:

HARRY F. MANBECK, JR.

*Attesting Officer*  *Commissioner of Patents and Trademarks*